United States Patent [19]

Kleemann et al.

[11] Patent Number: 4,780,293

[45] Date of Patent: Oct. 25, 1988

[54] PROCESS FOR THE PRODUCTION OF MADDRELL'S SALT

[75] Inventors: Stephan Kleemann, Schriesheim; Alexander Maurer, Mannheim; Albert Erasmus, Ladenburg; Wilhelm Spatz, Reichelsheim, all of Fed. Rep. of Germany

[73] Assignee: Benckiser-Knapsack GmbH, Ladenburg, Fed. Rep. of Germany

[21] Appl. No.: 936,380

[22] Filed: Dec. 1, 1986

[30] Foreign Application Priority Data

Dec. 7, 1985 [DE] Fed. Rep. of Germany ....... 3543394

[51] Int. Cl.$^4$ .................... C01B 15/16; C01B 25/26
[52] U.S. Cl. .................... 423/314; 423/265; 423/308
[58] Field of Search .......................... 423/314

[56] References Cited

U.S. PATENT DOCUMENTS

| | | | |
|---|---|---|---|
| 2,356,799 | 8/1944 | Taylor et al. | |
| 2,379,100 | 6/1945 | Partridge | 423/314 |
| 3,393,974 | 7/1968 | Rohlfs et al. | 423/314 |
| 4,029,742 | 6/1977 | Sommer et al. | 423/314 |
| 4,162,300 | 7/1979 | Adrian et al. | 423/314 |

FOREIGN PATENT DOCUMENTS

| | | | |
|---|---|---|---|
| 971729 | 7/1975 | Canada | 423/314 |
| 1442995 | 8/1969 | Fed. Rep. of Germany . | |
| 1667569 | 5/1971 | Fed. Rep. of Germany . | |
| 1792703 | 8/1972 | Fed. Rep. of Germany . | |
| 2161600 | 7/1973 | Fed. Rep. of Germany . | |
| 136954 | 8/1979 | German Democratic Rep. . | |
| 137573 | 9/1979 | Netherlands | 423/314 |
| 142959 | 7/1980 | Netherlands | 423/314 |
| 1200241 | 7/1970 | United Kingdom | 423/314 |

*Primary Examiner*—John Doll
*Assistant Examiner*—Wayne A. Langel
*Attorney, Agent, or Firm*—Foley & Lardner, Schwartz, Jeffery, Schwaab, Mack, Blumenthal & Evans

[57] ABSTRACT

The invention provides a process for the production of Maddrell's salt, wherein solid sodium dihydrogen phosphate and/or disodium dihydrogen pyrophosphate, containing catalytic amounts of an acid or of an acid-generating compound statistically distributed therein, is brought to condensation at an elevated temperature.

11 Claims, No Drawings

PROCESS FOR THE PRODUCTION OF MADDRELL'S SALT

BACKGROUND OF THE INVENTION

The present invention relates to a process for the production of Maddrell's salt by the condensation of sodium dihydrogen phosphate and/or disodium dihydrogen pyrophosphate at 250° to 500° C.

A preferred use of Maddrell's salt is as a cleaning material in toothpastes. Consequently, there is required the smallest possible proportion of water-soluble components, which consist of preponderantly acidic sodium pyrophosphate, sodium trimetaphosphate, and soluble sodium polyphosphate. In the case of the usual production of Maddrell's salt, by thermal condensation of monosodium orthophosphate, the proportion of water-soluble byproducts is dependent upon the reaction conditions, especially the temperature used, and generally is about 5 percent. Accordingly, an object of the present invention is to provide a new and faster process for the formation of Maddrell's salt with a corresponding improvement of the quality thereof.

Because of its importance, the knowledge about Maddrell's salt is relatively great and several processes are known for its production.

According to F. Thilo and R. Ratz (258 Z. Anorg. Allg. Chem. 53 (1949)), Maddrell's salt is produced by heating monosodium dihydrogen phosphate for several days at 350° C. and then washing with water to remove water-soluble by-products which are still present in very considerable quantities.

D. E. Corbridge and F. R. Tromans (30 Analytical Chemistry 1101–1110 (1958)) also describe the formation of Maddrell's salt by heating monosodium orthophosphate to 380° C. for several days and subsequently washing the tempered product with water.

Federal Republic of Germany Patent Specification No. 16 67 569 describes a process for the production of Maddrell's salt from sodium dihydrogen phosphate by heating to 450° C., with the water vapor resulting from the condensation being removed at water vapor partial pressures of from 50 to 450 Torr.

According to Federal Republic of Germany Patent Specification No. 21 61 600, Maddrell's salt may be obtained by the condensation of monosodium orthophosphate at temperatures of from 300° to 380° C. in the presence of water vapor, with the condensation being carried out in a saturated water vapor atmosphere.

It is known from J. R. van Wazer (Phosphorus and its compounds, Vol. I, p. 668) that, in the case of the condensation of monosodium orthophosphate to give Maddrell's salt at 400° C., water vapor arises due to the splitting off of the water of constitution which, under certain circumstances, can have a negative effect on the formation of the Maddrell's salt.

U.S. Pat. No. 2,356,799 discloses a process for the production of Maddrell's salt which has a proportion of water-soluble material of about 4 percent. In a first process step, monosodium orthophosphate is converted into pellets which, by heating to a temperature of from 300° to 460° C., react to give Maddrell's salt. This process is laborious and, because of the additional pelletizing step, is also cost-intensive.

In the case of repeating another known process disclosed in 81 J. Am. Chem. Soc. 79 (1959), it was found that the water-soluble proportion of the end product could not be reduced to below 5 percent, referred to the substance, either by pelletizing or by very fine grinding of the monosodium orthophosphate, or by especially long thermal treatment.

German Democratic Republic Patent Specification No. 137,573, discloses that Maddrell's salt can be produced with a metaphosphate content of less than 2 percent when at least 2 parts of powdered Maddrell's salt are mixed with at most one part of sodium orthophosphate and the mixture is heated, at a rate of more than 50° C. per minute, to 300° to 400° C. and then tempered. In this process, only a one-third yield is obtained and a high control expense is needed.

Furthermore, German Democratic Republic Patent Specification No. 142 959 discloses that Maddrell's salt is formed when monosodium orthophosphate is heated with at least 15% amorphous disodium diphosphate.

Federal Republic of Germany Patent Specification No. 25 15 370, discloses a process for the production of Maddrell's salt by heating monosodium orthophosphate or disodium pyrophosphate at a temperature of from 250° to 450° C., with the reaction rate being increased by adding catalytic amounts of nitrogen-containing bases.

It is therefore possible to start from the process disclosed, for example, in Federal Republic of Germany Patent Specification No. 17 92 703, for the production of chain-shaped, condensed ammonium phosphates, the speed of formation of which can be accelerated by the addition of the base so as to be above the stoichiometrically necessary ratio. The nitrogen-containing base is usually added as a finely-divided powder in the form of the corresponding phosphoric acid salt. In exceptional cases, i.e., only if these salts are not temperature-sensitive, they can also be added to the sodium phosphate before the spraying.

According to all of these processes, a Maddrell's salt is obtained which, besides containing about 5 to 10 percent of by-products which can be washed out with water, also contains, in the interior of the crystals, soluble products which cannot be separated by thorough washing out, and which can only be separated laboriously.

Therefore, the problem exists of finding a new process by which Maddrell's salt can be produced simply and economically, with the salt containing little or no water-soluble components.

SUMMARY OF THE INVENTION

Thus, according to the present invention, there is provided a process for the production of Maddrell's salt, wherein solid sodium dihydrogen phosphate, and/or disodium dihydrogen pyrophosphate which contains catalytic amounts of an acid or of an acid-generating compound statistically distributed therein is brought to condensation at an elevated temperature.

In accomplishing the foregoing objects, there has been provided in accordance with one aspect of the present invention a process for the production of Maddrell's salt, comprising heating at least one solid phosphate compound selected from the group consisting of sodium dihydrogen phosphate and disodium dihydrogen pyrophosphate, wherein said phosphate compound further comprises a catalytically effective amount of an acid or an acid-generating compound statistically distributed therein, to a temperature sufficient to effect condensation whereby Maddrell's salt is obtained.

DETAILED DESCRIPTION OF PREFERRED EMBODIMENTS

According to the invention, the acid or acid-generating compound used is statistically distributed in the crystal lattice of the phosphate compound and the condensation is preferably carried out at a temperature of from 250° to 500° C. The conversion is complete and Maddrell's salt is formed in pure form. In addition, the reaction proceeds 2 to 3 times more quickly in comparison to the previously known processes.

The acid used is preferably orthophosphoric acid, polyphosphoric acid, phosphorous acid, or hypophosphorous acid which, in the case of the thermal condensation, does not vaporize and does not impair the subsequent use of the Maddrell's salt as a cleaning material.

As acid-generating compounds, those compounds are especially preferred which, upon heating to 400° C., decompose into the free acid, preferably phosphoric acid, polyphosphoric acid, phosphorous acid, or hypophorphorous acid, and into a component which is volatile at this temperature. Preferably, ammonium-containing phosphorus compounds are used, for example, monoammonium dihydrogen phosphate, diammonium hydrogen phosphate or diammonium dihydrogen pyrophosphate, but other suitable phosphorous compounds include saturated, unsaturated, linear, branched or cyclic mono-, di-, or trialkylammonium-containing phosphates with 1 to 10 carbon atoms, for example methylammonium dihydrogen phosphate, dimethylammonium dihydrogen phosphate, trimethylammonium dihydrogen phosphate, ethylammonium dihydrogen phosphate, diethylammonium dihydrogen phosphate, triethylammonium dihydrogen phosphate and cyclohexylammonium dihydrogen phosphate, as well as urea phosphate, guanidine phosphate, hydroxylamine dihydrogen phosphate and ammonium polyphosphate. Further compounds of this kind are well known to those persons skilled in the art. Mixtures of the compounds can also be used.

The acid or acid-generating compounds are admixed in amounts of from 0.05 to 10 mole percent, and preferably of from 0.5 to 5 mole percent, based on the solid material.

The production of the solid starting materials preferably takes place from a common solution of sodium dihydrogen phosphate and/or disodium dihydrogen pyrophosphate and the acid or acid-generating compound, whereby the sodium salt can also be produced in situ by neutralizing the acid, either by co-crystallization or by known methods of concentration, as for example, by spray drying or drying in a rotary kiln, kneader, or mixing aggregate, preferably in a vacuum. However, these examples are only given by way of example.

The reaction of the starting materials to give Maddrell's salt takes place by heating at a temperature of from about 250° to 500° C., and preferably from about 280° to 380° C. The device used can be, for example, a fluidized bed, a rotary kiln, or a heatable kneader. Insofar as this device has also served for the production of the starting material from an appropriate solution, both processes can also be carried out directly after one another. Whereas, however, for the thorough drying of the starting material, it is more advantageous to work under a reduced pressure, for example at about 50 to 450 Torr, and preferably at about 100 to 300 Torr, the reduced pressure may lead to undesired technical problems during subsequent tempering to give Maddrell's salt because of the co-entrainment of powdered product. Consequently, the pressure should be increased during further processing.

Insofar as an acid-generating compound is used, the volatile part is either already liberated in the production and drying of the starting material or it escapes during the tempering.

Components of the salts which can be condensed at ambient temperature, for example trimethylamine, triethylamine, or cyclohexylamine, can be recovered simply by subsequent condensation from the waste gases and then used again.

Components which are more difficult to condense, for example ammonia or methylamine, are either washed out with water or are bound with an acid in order to avoid impairment of the environment by the waste gases.

If, for example, the production of the solid starting material takes place by crystallization of sodium dihydrogen phosphate in the presence of catalytic amounts (0.1 to 5 percent) of monoammonium dihydrogen phosphate, then a crystalline monosodium dihydrogen phosphate is obtained which contains, for example, 0.3 to 2.5 percent by weight of monoammonium dihydrogen phosphate. This product differs significantly from the pure monosodium dihydrogen phosphate by its X-ray spectrum which shows that it is a new, uniform product and not a mixture of crystals of the two starting materials.

The following Examples are given for the purpose of illustrating the present invention in comparison with the known processes. The Examples give the particular amounts of the various components which were used for the production of the starting materials. The phosphoric acid was used as a 50 percent aqueous solution, the sodium hydroxide as a 40 percent aqueous solution, and the ammonia as a concentrated aqueous solution. Drying was carried out in a rotary evaporator at a pressure of about 50 Torr. All the reactions were carried out in an oil-heated kneader. The oil temperature was 330° C.±1° C., and the product temperature was about 290° C.

In all of the Examples, the dry starting material was placed in the kneader, which had been pre-heated to 150° C., and was heated to an end temperature of 330° C. (oil temperature) within the course of about 75 minutes. The material was subsequently kneaded, up to the commencement of aspiration of solid material, at a water vapor partial pressure of about 200 Torr.

The statements of percentage refer to mole percent and the times, given in hours, refer in all cases to that point in time at which the oil bath temperature of 330° C. was achieved.

The yields of Maddrell's salt were determined by gravimetric double determinations of the water-insoluble portion.

It can clearly be seen from the Examples that, according to the process of the present invention, Maddrell's salt is formed more quickly and completely than by previous processes.

EXAMPLE 1

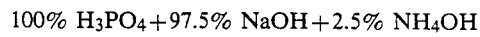

100% $H_3PO_4$ + 97.5% NaOH + 2.5% $NH_4OH$

The phosphoric acid was neutralized with the appropriate amount of ammonia and sodium hydroxide and subsequently was evaporated in a rotary evaporator.

| time (h) | 0.5 | 1 | 2 | 3 | 4 | 5 | 6 | 7 |
|---|---|---|---|---|---|---|---|---|
| yield (%) | 2.9 | 6.3 | 43.1 | 88.6 | 95.2 | 96.5 | 97.6 | 98.2 |

EXAMPLE 2

100% $H_3PO_4$ + 99% NaOH

The phosphoric acid was neutralized with the appropriate amount of sodium hydroxide and subsequently was evaporated in a rotary evaporator.

| time (h) | 0.5 | 1 | 2 | 3 | 4 | 5 | 6 | 7 |
|---|---|---|---|---|---|---|---|---|
| yield (%) | 11.1 | 18.4 | 27.9 | 41.0 | 56.6 | 75.5 | 89.2 | 95.5 |

EXAMPLE 3

$NaH_2PO_4$ + 1.5% $H_3PO_4$

The sodium dihydrogen phosphate (cf. Example 4) was dissolved in water, mixed with the appropriate amount of phosphoric acid, and subsequently was evaporated in a rotary evaporator.

| time (h) | 0.5 | 1 | 2 | 3 | 4 | 5 | 6 | 7 |
|---|---|---|---|---|---|---|---|---|
| yield (%) | 8.1 | 20.8 | 50.5 | 74.3 | 85.8 | 94.3 | 95.1 | 97.4 |

EXAMPLE 4

100% $H_3PO_4$ + 98% NaOH + 2% $CH_3NH_2$

The phosphoric acid was neutralized with the appropriate amount of methylamine and sodium hydroxide and subsequently was evaporated in a rotary evaporator.

| time (h) | 0.5 | 1 | 2 | 3 | 4 | 5 | 6 | 7 |
|---|---|---|---|---|---|---|---|---|
| yield (%) | 6.4 | 12.8 | 38.1 | 72.5 | 85.0 | 94.2 | 95.9 | 97.1 |

EXAMPLE 5

100% $H_3PO_4$ + 100% NaOH ($NaH_2PO_4$ as control experiment)

The phosphoric acid was neutralized with the appropriate amount of sodium hydroxide and was evaporated in a rotary evaporator to give sodium dihydrogen phosphate.

| time (h) | 0.5 | 1 | 2 | 3 | 4 | 5 | 6 | 7 |
|---|---|---|---|---|---|---|---|---|
| yield | 0.5 | 0.6 | 0.6 | 0.7 | 0.8 | 0.9 | 1.0 | 1.0 |

| time (h) | 0.5 | 1 | 2 | 3 | 4 | 5 | 6 | 7 |
|---|---|---|---|---|---|---|---|---|
| (%) | | | | | | | | |

EXAMPLE 6

$NaH_2PO_4$ + 1.5% $NH_4H_2PO_4$ (comparative example according to Federal Republic of Germany Patent Specification No. 25 15 370)

The dry sodium dihydrogen phosphate according to Example 4 was mixed with the appropriate amount of solid, pulverized monoammonium phosphate and intensively mixed.

| time (h) | 0.5 | 1 | 2 | 3 | 4 | 5 | 6 | 7 |
|---|---|---|---|---|---|---|---|---|
| yield (%) | 0.2 | 1.3 | 6.8 | 26.3 | 49.9 | 61.3 | 71.5 | 74.6 |

What is claimed is:

1. A process for the production of Maddrell's salt, comprising heating a reaction mixture consisting essentially of at least one solid phosphate compound selected from the group consisting of sodium dihydrogen phosphate and disodium dihydrogen pyrophosphate, and a catalytically effective amount of an acid statistically distributed therein, to a temperature sufficient to effect condensation, whereby Maddrell's salt is obtained.

2. A process as claimed in claim 1, wherein the acid is selected from the group consisting of orthophosphoric acid, polyphosphoric acid, phosphorous acid, and hypophosphorous acid.

3. A process as claimed in claim 1, wherein the acid comprises from about 0.05 to 10 mole percent of the total amount of and phosphate compound.

4. A process as claimed in claim 3, wherein the acid comprises from about 0.5 to 5 mole percent of the total amount of phosphate compound.

5. A process as claimed in claim 1, wherein the phosphate compound is heated to a temperature of from about 250° to 500° C. to obtain Maddrell's salt.

6. A process as claimed in claim 5, wherein the phosphate compound is heated to a temperature of from about 280° to 380° C. to obtain Maddrell's salt.

7. A process as claimed in claim 1, wherein the statistical distribution of the acid within the solid phosphate compound is achieved by evaporating a common solution of the acid and the phosphate compound.

8. A process as claimed in claim 1, wherein the statistical distribution of the acid within the solid phosphate compund is achieved by spray-drying a common solution of the acid and the phosphate compound.

9. A process as claimed in claim 1, wherein the statistical distribution of the acid within the solid phosphate compund is achieved by crystallizing a common solution of the acid and the phosphate compound.

10. A process as claimed in claim 1, wherein the condensation is effected, up to the obtainment of a dry solid material, at a water vapor partial pressure of from about 50 to 450 Torr.

11. A process as claimed in claim 10, wherein the condensation is effected, up to the obtainment of a dry solid material, at a water vapor partial pressure of from about 100 to 300 Torr.

* * * * *